(12) United States Patent
Forster (10) Patent No.: US 11,296,398 B2
(45) Date of Patent: Apr. 5, 2022

(54) METHODS FOR CREATING RFID TAGS BASED ON FLEXIBLE ANTENNA MATERIALS

(71) Applicant: Avery Dennison Retail Information Services, LLC, Westborough, MA (US)

(72) Inventor: Ian Forster, Chelmsford (GB)

(73) Assignee: Avery Dennison Retail Information Services LLC, Mentor, OH (US)

( * ) Notice: Subject to any disclaimer, the term of this patent is extended or adjusted under 35 U.S.C. 154(b) by 1005 days.

(21) Appl. No.: 15/286,831

(22) Filed: Oct. 6, 2016

(65) Prior Publication Data

US 2018/0102585 A1   Apr. 12, 2018

(51) Int. Cl.
  *H01Q 1/22*    (2006.01)
  *G06K 19/077*  (2006.01)
  *H01Q 1/38*    (2006.01)

(52) U.S. Cl.
  CPC ....... *H01Q 1/2208* (2013.01); *G06K 19/0775* (2013.01); *G06K 19/07718* (2013.01); *G06K 19/07786* (2013.01); *H01Q 1/2225* (2013.01); *H01Q 1/38* (2013.01)

(58) Field of Classification Search
  CPC ...... G06K 19/07773–07794; G06K 19/07718; H05K 3/103; H01Q 1/2225; H01Q 1/38
  See application file for complete search history.

(56) References Cited

U.S. PATENT DOCUMENTS

| 7,158,037 | B2 | 1/2007 | Forster et al. |
| 7,253,735 | B2 | 8/2007 | Gengel et al. |
| 7,598,867 | B2 | 10/2009 | Carrender |
| 8,251,295 | B2 | 8/2012 | Ritamaki et al. |
| 8,467,192 | B2 | 6/2013 | Stromberg |
| 2004/0032377 | A1 | 2/2004 | Forster et al. |
| 2008/0072423 | A1* | 3/2008 | Finn ................. G06K 19/07327 29/854 |

(Continued)

FOREIGN PATENT DOCUMENTS

| CN | 104915979 | 9/2015 |
| SG | 174832 | 10/2011 |
| WO | 2007110254 | 10/2007 |

OTHER PUBLICATIONS

International Search Report and Written Opinion dated Mar. 21, 2018 for IA No. PCT/US2015/055406.

(Continued)

*Primary Examiner* — Livius R. Cazan (57) ABSTRACT

Methods and systems form shaped wire lengths of flexible wire materials by use of dispensing heads and movement of same in a direction along an axis different from the axis of movement followed by a web of material with which the thus formed shaped wire lengths are combined or to which the thus formed shaped wired are secured or adhered by adhesives applied onto the web prior to or during dispensing. Items are prepared that are suitable for use as antenna components of RFID devices. Also, RFID elements can be positioned on the web and the shaped wire length applied to the RFID element to provide a combination RFID device having both antenna and RFID element. Shaping of the flexible wires is achieved in manufacturing times substantially shorter than other methods and systems.

18 Claims, 8 Drawing Sheets

(56) References Cited

U.S. PATENT DOCUMENTS

2012/0286902 A1* 11/2012 Michalk .......... G06K 19/07749
333/219
2013/0181901 A1 7/2013 West
2015/0002374 A1 1/2015 Erinjippurath et al.

OTHER PUBLICATIONS

International Preliminary Report on Patentability dated Apr. 9, 2019 issued in corresponding IA No. PCT/US2017/055525 filed Oct. 6, 2017.

* cited by examiner

METHODS FOR CREATING RFID TAGS BASED ON FLEXIBLE ANTENNA MATERIALS

BACKGROUND

Field of the Disclosure

The present subject matter relates to creating shaped wire tags useful as antennas and assembly of the shaped wire tags to a moving web to form components useful as or as component of radio frequency identification ("RFID") devices. The approach of the present disclosure combines web movement in one direction and wire dispensing in a different direction.

Description of Related Art

RFID tags and labels (collectively referred to herein as "devices") are widely used to associate an object with an identification code. RFID devices generally have a combination of antennae and analog and/or digital electronics, which may include, for example, communications electronics, data memory, and control logic. For example, RFID tags are used in conjunction with retail security systems, security locks in cars, for access control to buildings, and for tracking inventory and parcels. Various examples of RFID tags and labels are known in the art.

Automatic identification of products has become commonplace. For example, the ubiquitous technology used for automatic identification products is RFID. RFID uses labels or "tags" that include electronic components that respond to radio frequency ("RC") commands and signals to provide identification of each tag wirelessly. Generally, RFID tags and labels comprise an integrated circuit ("IC", or chip) attached to an antenna that responds to a reader using radio waves to store and access the information in the chip.

One of the obstacles to more widespread adoption of RFID technology is the cost of RFID tags and difficulties for optimization of economical manufacturing of RFID tags. Increased demand for RFID tags has manufacturers continuously seeking cost reduction and manufacturing simplification and speed. One area for which cost reduction and manufacturing simplification and speed are sought concerns antenna components for RFID devices. Flexible antenna materials such as metallic or metallic containing wires provide many advantageous properties and characteristics, including strength, flexibility and good RF-energy conduction. However, these favorable properties and characteristics are not fully utilized due to the relative slowness and costliness of manufacturing or assembly techniques for transforming flexible materials such as wires into shaped components suitable for antenna use on RFID or other devices. Current methods typically use a dispensing head that moves over a stationary substrate, which methods are relatively slow particularly when compared with other current technology used in methods of making antennas for RFID devices and other devices.

Assembly difficulties tend to increase as RFID chips and their components become smaller. For example, to interconnect the relatively small contact pads on the chips with the antennas, intermediate structures variously referred to as "straps," "interposers," and "carriers" are sometimes used to facilitate manufacture. Interposers for example typically include conductive leads or pads that are electrically coupled to the contact pads of the chips for coupling to the antennas. Depending on intended use or other requirements, antennas will be assembled to or with these types of components.

SUMMARY

There are several aspects of the present subject matter which may be embodied separately or together in the devices and systems described and claimed below. These aspects may be employed alone or in combination with other aspects of the subject matter described herein, and the description of these aspects together is not intended to preclude the use of these aspects separately or the claiming of such aspects separately or in different combinations as may be set forth in the claims appended hereto.

Generally, aspects or embodiments of the present disclosure combing using a wire dispenser head moving in one direction to dispense wire and/or other components over a substrate running in a different direction under continuous roll-to-roll process. Such approaches include methods that result in the ability to create antennas at relatively high speeds and relatively low costs.

In one aspect, an embodiment of a method of producing antenna components, and antenna components thus produced, include translating a web in a first direction, positioning a dispenser head to be closely spaced from the translating web while oscillating the dispenser head and dispensing wire therefrom, the oscillating being in a second direction that is different from the flow direction of the web. This combined action deposits a flow of wire through the moving dispenser and onto the translating web so as to form shaped wire lengths on the web. The shaped wire lengths are suitable to provide antenna components that are combined with the receptor surface of the web. When the shaped wire lengths are properly secured to other RFID components, a plurality of RFID devices can be manufactured.

In another aspect, an embodiment of a method is provided for producing wire RFID antenna components, and wire RFID antenna components thus produced, include translating a web in a first direction, positioning a dispenser head to be closely spaced from the receiving surface of roll-to-roll translating web while oscillating the dispenser head and dispensing wire therefrom, the oscillating being in a second direction that is substantially perpendicular to the first or flow direction of the web. This combined action deposits a flow of wire on the moving web so as to form shaped wire lengths on the web in that the relative motion places the wire onto the web in a controlled fashion. The shaped wire lengths are suitable as RFID antenna components that are secured to the receptor surface of the web. When the shaped wire lengths are properly secured to RFID components, a plurality of RFID devices can be manufactured.

In a further aspect, an embodiment of a method is provided for producing antenna components, and antenna components thus produced, include translating a web in a first direction, positioning a dispenser head to be closely spaced from the translating web while oscillating the dispenser head and dispensing wire therefrom, the oscillating action being in a second direction that is different from the flow direction of the web. This combined action deposits the flow of oscillating wire on the moving web so as to form shaped wire lengths on the web. The shaped wire lengths are severed into discrete antenna structures suitable for securing to a receptor surface of the web. Severing can occur when best suited to the particular manufacturing operation, for example before or after deposit onto the web. When the shaped wire lengths are properly secured to RFID components, a plurality of RFID devices can be manufactured.

An added embodiment is a method provided for producing antenna components, and antenna components thus produced. Same include translating a web in a first direction, positioning a dispenser head to be closely spaced from the translating web while oscillating the dispenser head and dispensing wire therefrom, the oscillating being generally along a directional axis that is oriented in a second direction that is different from the first or flow direction of the web. In addition, the dispenser head moves generally along a directional axis that is oriented in a third direction. This combined action deposits a flow of wire on the moving web so as to form more complexly shaped wire lengths on the web than when only the first and second directional movements are made. The shaped wire lengths are suitable to provide antenna components that are secured to a receptor surface of the web. When the shaped wire lengths are properly secured to RFID components, a plurality of RFID devices can be manufactured.

According to another aspect, embodiments of a method and product produced thereby are provided for producing antenna components, and antenna components thus produced, include translating a web in a first direction along a first directional axis, positioning a dispenser head to be closely spaced from the translating web while oscillating the dispenser head and dispensing wire therefrom, the oscillating being along a directional axis being a second directional axis that is generally perpendicular to the first or flow directional axis of the web. In addition, the dispenser head moves, as directed, along a third directional axis that is generally parallel to the first directional axis flow of the web. This combined action deposits a flow of wire on the moving web so as to form more complexly shaped wire lengths on the web than when only the first and second directional movement is practiced. The shaped wire lengths are suitable to provide antenna components that are secured to a receptor surface of the web. When the shaped wire lengths are properly secured to RFID components, a plurality of RFID devices can be manufactured.

In a further aspect, embodiments of a method and product produced thereby are provided for producing antenna components, and antenna components thus produced, include translating a web in a first direction along a first directional axis, positioning a dispenser head to be closely spaced from the translating web while oscillating the dispenser head and dispensing wire therefrom, the oscillating being along a second directional axis that is generally perpendicular to the first or flow directional axis of the web. In addition, the dispenser head moves, as directed, along a third directional axis that is generally parallel to the first directional axis flow of the web. This combined action deposits a flow of wire on the moving web so as to form more complexly shaped wire lengths on the web than when only the first and second directional movement is practiced according to a timing pattern selected from simultaneous movement to provide a non-linear and/or curved path, movement along the second directional axis and not the third directional axis, and movement along the third directional axis and not the second directional axis. The shaped wire lengths are suitable to provide antenna components that are secured to a receptor surface of the web. When the shaped wire lengths are properly secured to RFID components, a plurality of RFID devices can be manufactured.

In another aspect, is a method provided for producing antenna components, and antenna components thus produced. Same include translating a web in a first direction, positioning a dispenser head to be spaced from the translating web while oscillating the dispenser head and dispensing wire therefrom, the oscillating being generally along a directional axis that is oriented in a second direction that is different from the first or flow direction of the web. In addition, the web includes a plurality of RFID chips spaced therealong, and the dispenser head moves generally along a directional axis that is oriented in a third direction. This combined action deposits a flow of wire on the moving web so as to form more complexly shaped wire lengths on the RFID elements along the web than when only the first and second directional movements are made. The shaped wire lengths are suitable to provide antenna components for the RFID elements which are combined in a single step manufacturing operation for making RFID devices.

In a further aspect, an embodiment of a method is provided for producing antenna components, and antenna components thus produced, include providing a web having discrete areas of adhesive spaced therealong, translating the web in a first direction, positioning a dispenser head to be closely spaced from the translating web while oscillating the dispenser head and dispensing wire therefrom, the oscillating action being in a second direction that is different from the flow direction of the web. This combined action deposits the flow of oscillating wire onto the adhesive areas of the moving web so as to form shaped wire lengths on the web. The shaped wire lengths are severed into discrete antenna structures suitable for securing to a receptor surface of the web. Severing can occur when best suited to the particular manufacturing operation, for example before or after deposit onto the web. When the shaped wire lengths are properly secured to RFID components, a plurality of RFID devices can be manufactured.

An added embodiment of a method is provided for producing antenna components, and antenna components thus produced, include providing a web having a plurality of RFID elements spaced therealong, translating the web in a first direction, positioning a dispenser head to be closely spaced from the translating web while oscillating the dispenser head and dispensing wire therefrom, the oscillating action being in a second direction that is different from the flow direction of the web. This combined action deposits the flow of oscillating wire onto respective RFID elements, of the moving web so as to form shaped wire lengths on the web. The shaped wire lengths are severed into discrete antenna structures suitable for securing to a receptor surface of the web. If not already severed into discrete shaped wire lengths, severing can occur when best suited to the particular manufacturing operation. The result is to have the shaped wire lengths be antenna components secured to the RFID elements, respectively, thereby forming a plurality of RFID devices in a manufactured flow along a single line.

According to another aspect, an embodiment of a method of producing antenna components, and antenna components thus produced, include translating a web in a first direction, positioning a dispenser head to be spaced above the translating web while oscillating the dispenser head and dispensing wire therefrom, the oscillating being in a second direction that is different from the flow direction of the web. The dispensing head also includes adhesive dispensing features whereby the wire and adhesive are dispensed together onto the web. This combined action deposits a flow of wire and adhesive through the moving dispenser and onto the translating web so as to form shaped wire lengths on the web that are within adhesive. The shaped wire lengths, adhesive and web form antenna components that are combined with the receptor surface of the web. When the shaped wire lengths are properly secured to other RFID components, a plurality of RFID devices can be manufactured.

DESCRIPTION OF THE ILLUSTRATED EMBODIMENTS

As required, detailed embodiments of the present invention are disclosed herein; however, it is to be understood that the disclosed embodiments are merely exemplary of the invention, which may be embodied in various forms. Therefore, specific details disclosed herein are not to be interpreted as limiting, but merely as a basis for the claims and as a representative basis for teaching one skilled in the art to variously employ the present invention in virtually any appropriate manner.

Figure 1:
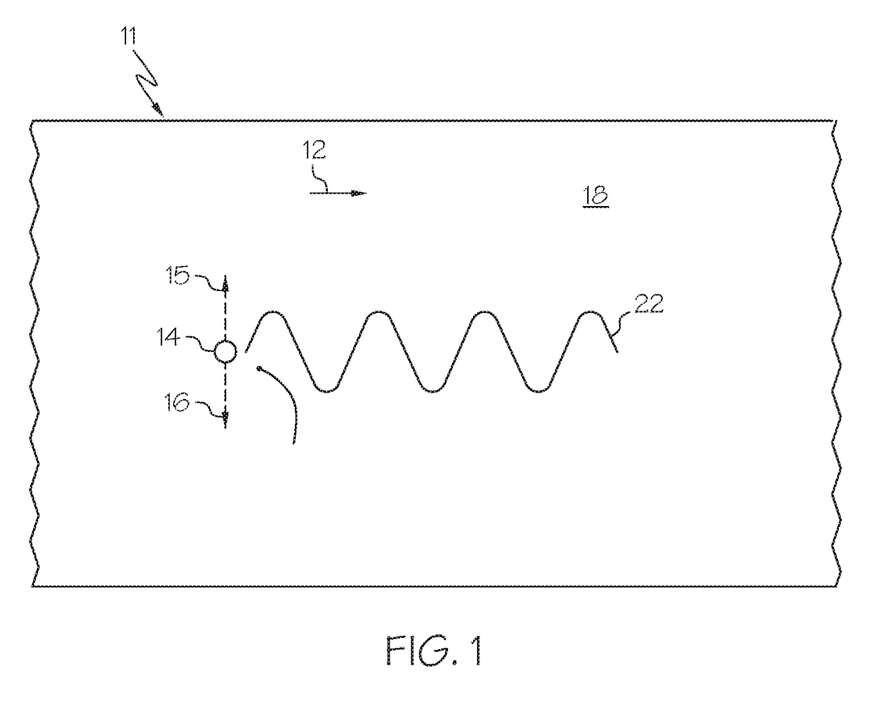
FIG. 1 is a diagrammatic plan view of an embodiment of a roll-to-roll conductive strip manufacture illustrating basic principles of the present invention.

A web of substrate material is generally indicated at 11 in FIG. 1. This web is provided for the purpose of receiving wire components and serving as the backing or support for structure sized, shaped and configured for use as a component of an RFID device. The web translates in a linear direction of motion as illustrated by the arrow marking 12 on FIG. 1 through the use of a suitable translating mechanism available in the art. This linear direction translation of the web is considered to be along a first directional axis. For example, a roll of web material can be unrolled along a horizontal path as illustrated in FIG. 1 and collected after receiving added components as discussed herein. Alternatively, the web and added components can move to another processing station. Mechanical support for lateral movement or translation of the web typically is provided in accordance with machinery, devices or structures known in the art such as conveying systems.

This action can be considered to follow a roll-to-roll approach whereby an element (a web in this instance) traverses a path following the first directional axis and receives additions to the web along the path of the web. Typical web materials include cellulosic structures such as paper, fabric or polymers, for example polyesters such as polyethylene terephthalate (PET), or other web suitable materials providing properties needed for the specific function intended for use of the resulting assembly including the web 11.

Figure 3A:
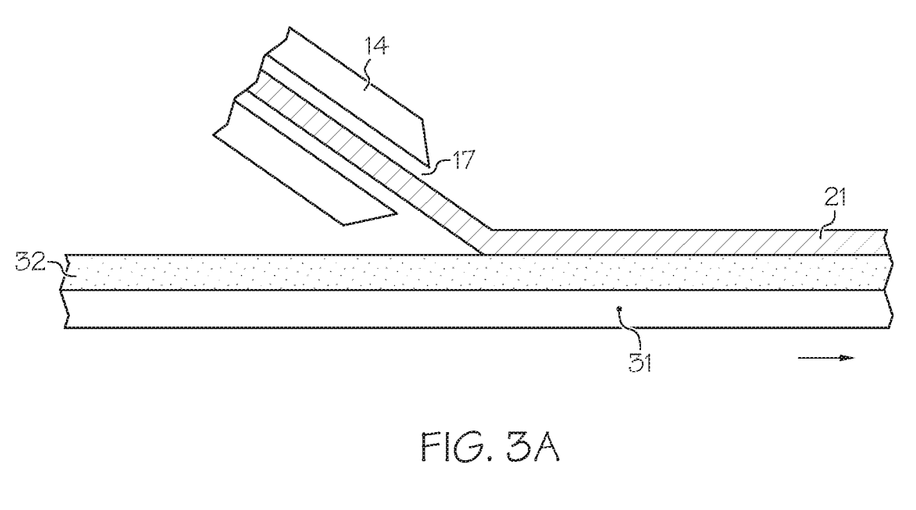
FIG. 3A is a diagrammatic side or elevation view of an embodiment of a dispenser head arrangement, particularly with respect to securement using an adhesive component.
Figure 3B:
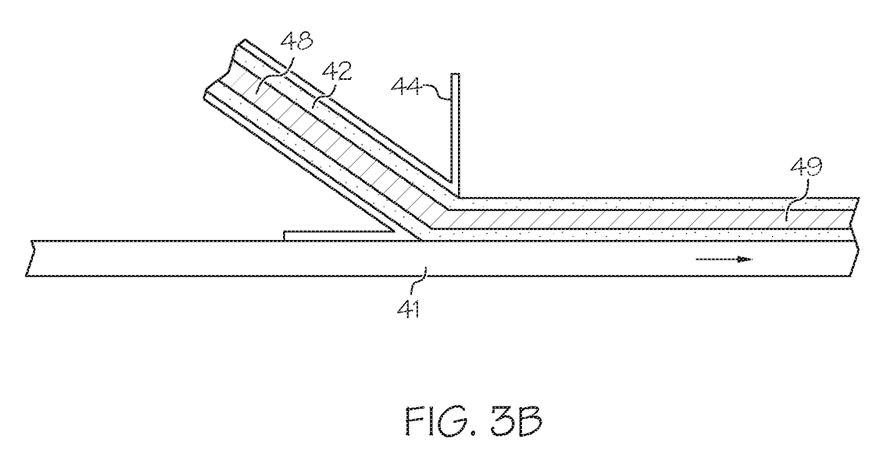
FIG. 3B is a diagrammatic side or elevation view of a further embodiment of a dispenser head and securing adhesive component relationship.
Figure 3C:
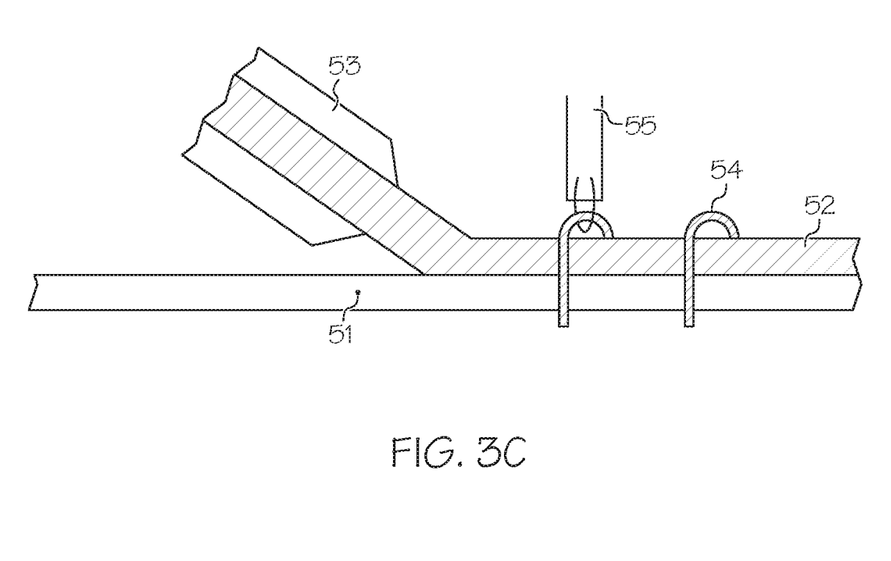
FIG. 3C is a diagrammatic side or elevation view of an additional embodiment of a dispenser head and wire securing arrangement.

A dispensing head and its action are schematically shown in FIG. 1 at 14 and by opposing direction arrowhead points 15 and 16, with the dispensing head moving along the thus illustrated path between limits such as at 15 and 16. In this embodiment, the dispensing head 14 can be considered to oscillate between points 15 and 16 along a pathway having a designated directional axis (second directional axis) that is different from the first directional axis followed by movement of the web 11. As generally illustrated in FIGS. 3A, 3B and 3C, for example, the dispensing head has an outlet 17 in FIG. 3A that is closely spaced from a surface, such as the illustrated receptor surface 18, of the web 11. The combination of dispensing head action with translational movement of the web provides a "cross-web" motion which "draws" a defined shape of dispensed material (wire) onto the web surface, for example the rounded "saw tooth" shape of wire lengths that are illustrated in FIG. 1.

A supply of flexible material that is suitable for use as the antenna-functional material of an antenna, particularly of an antenna for an RFID device such as a passive RFID device, is dispensed by the dispenser by way of the outlet 17 of the dispenser head 14 of the of the as generally shown in FIG. 3A or other embodiments. A suitable supply of flexible material is a wire or other flexible conductor material. These flexible conductors or wires are made of antenna-functional material such as metals including copper, aluminum, alloys, solid or braided, coated or uncoated metals, polymers with metal coatings and/or loadings and other materials known in the art for the particular antenna of the intended device such as an RFID device. A useful characteristic of wire material over printed or otherwise applied materials is the flexibility of the typical wire. Using wire for an antenna such as an RFID antenna provides advantages of strength, flexibility and good conductivity of radio-frequency (RF) energy. Such antennas are especially suitable for inclusion in RFID tags. In a typical arrangement, the outlet 17 is suitable for passing the wire 21 out of the dispenser head; for example, the shape cross-sectional shape of the outlet 17 can follow the shape of the wire, typically circular but other shapes are possible. Also, the perimeter of the outlet 17 typically is slightly larger than the wire to assist in close placement of the wire onto the web 11 without substantial frictional drag on passage of the wire out of the outlet 17.

As illustrated in various embodiments, including that of FIG. 1, the web's first directional axis and the dispenser outlet's second directional axis delineate movement in two separate dimensions. In this embodiment, the first and second directional axes are substantially perpendicular to each other. When these diverse movements are combined, the result is formation of non-linearly shaped wire lengths 22. Because the formation of such shapes is achieved by flowing action in multiple dimensions, the formation of the shaped wire lengths 22 is according to a high-speed method when compared with other antenna-formation technology Also, this movement action achieves net relative motion placing the wire onto the web 11 in a controlled fashion.

By way of further explanation of the interaction between the movement of the web 11 along the first directional axis and movement of the dispenser head along the second directional axis, reference is had to FIG. 1 as an example of a specific effect possible by this interaction. The antenna configuration is created as the wire transfers from the dispenser head onto the moving web. Using an approximate "sine wave" analogy, the relative movement of the dispenser head while dispensing the wire creates an "amplitude" type of formation along the sine wave, and the relative speed of the web or substrate creates the "period" of the "wavelength" formation along the sine wave. The result of a particular embodiment that does in fact approximate a sine wave pattern is shown in FIG. 1.

Figure 1A:
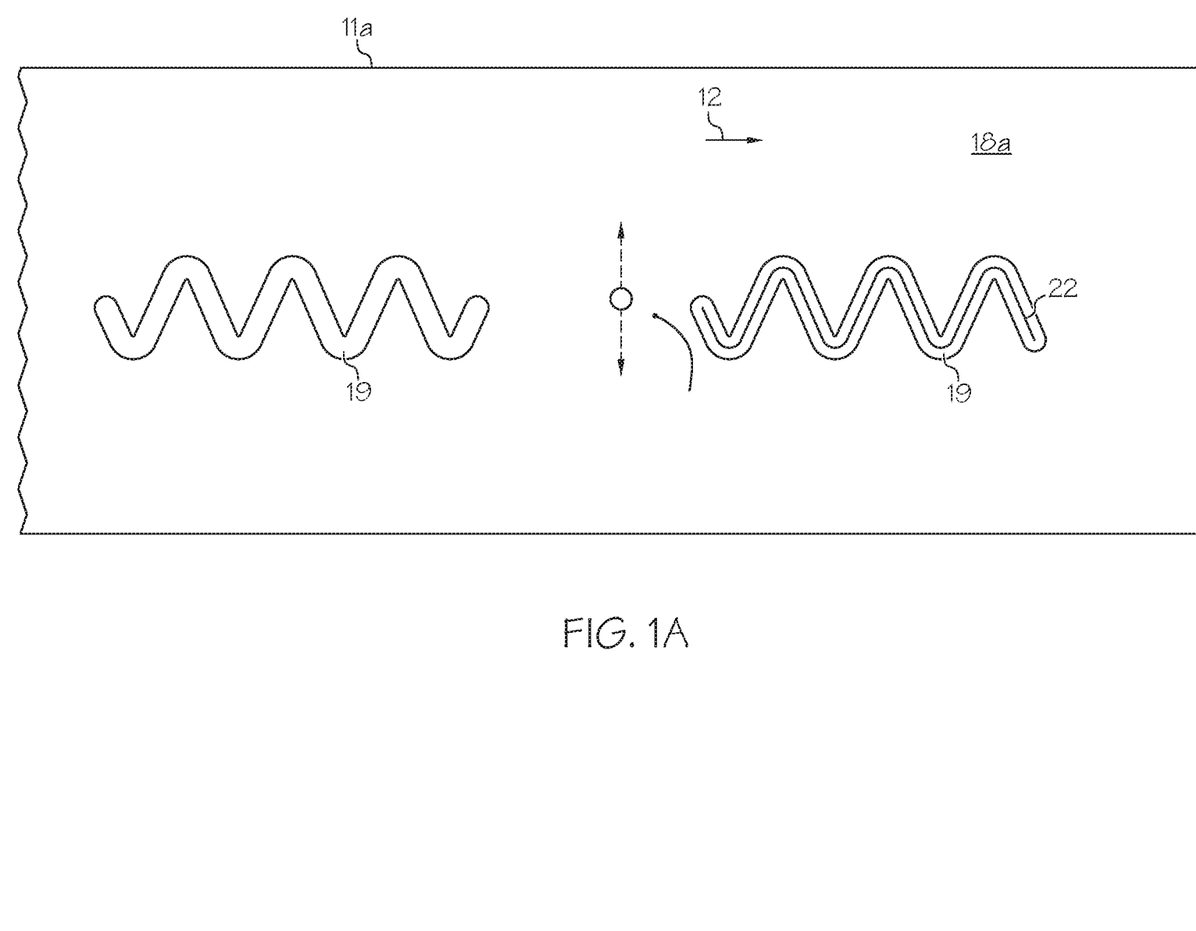
FIG. 1A is a diagrammatic plan view of an embodiment along the lines of FIG. 1 while providing spaced adhesive components that are patterned adhesive components.

When it is desired to conserve adhesive and reduce stiffness of the intermediate antenna component, the coated substrate or web 11 of FIG. 1 is replaced with a substrate or web 11a in FIG. 1A which applies adhesive in only discrete areas along the web. An illustrative embodiment in this regard provides a plurality of patterned adhesive areas 19, which can be printed onto or otherwise positioned on the receptor surface 18a of the web 11a. The positioning of the patterned adhesive areas 19 is such that the shaped wire length 22 from the dispenser head deposits the wire 22 onto the adhesive area 19. In the case where the adhesive areas 19 are shaped generally according to the shape of the shaped wire lengths, the adhesive receives the entire pattern of the wire with a reduced adhesive footprint such as avoiding full adhesive placement between adjacent peaks of the wire shape. Alternatively, the adhesive areas can be more simply shaped, for example a rectangle, and positioned along the length of the web such that the adhesive areas 19 accommodate all of the shaped wire lengths while allowing more leeway in the degree of exactness in placement of the shaped wire lengths on the adhesive areas during commercial manufacturing.

Figure 2:
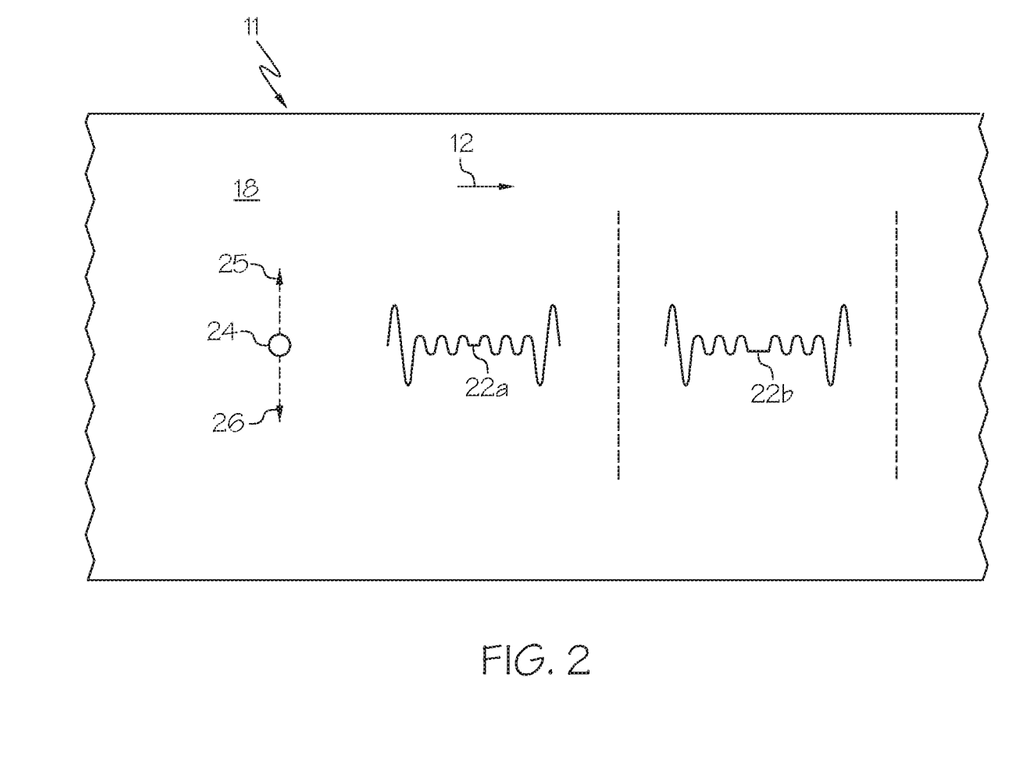
FIG. 2 is a diagrammatic plan view of an embodiment including the basics of FIG. 1 and adding a feature of severing the shaped wire.

FIG. 2 shows an embodiment that interrupts the wire dispensing by any suitable approach in order to place the shaped wire lengths as discrete shaped wire lengths 22a, 22b onto the web 11. Interrupting can be carried out by severing the wire before deposit onto the web, severing being by laser cutting action, by blade cutting action, by heat cutting action, for example. By interrupting before or at the time of deposit onto the web, the flow of antenna components according to this approach does not require severance action after deposit onto the web, but the flow of a plurality of such components is ready for use in the next processing step or steps or as a ready-to-use antenna component such as for an RFID device. In effect, discrete sections 22a, 22b for example of antenna are placed in already-shaped form onto the web 11. In an embodiment, severing can take place within or at the outlet of a dispensing and severing head 24 that oscillates in a manner similar to that of dispenser head 14, and between limit points 25 and 26.

It will be appreciated that the shaped wire lengths 22, whether provided as discrete wire sections 22a, 22b shaped wire lengths or not, usually will be secured to the web 11 to provide a supported antenna or other shaped wire length that is supported for further handling or assembly. Securement can be by action of an adhesive whereby the shaped wire length is deposited onto and onto or with an adhesive in order to hold the shaped wire length in place. Or securement can be by other members and actions. When an adhesive is used, same can be throughout the web receptor surface 18 or on only a portion of the web, such as at discrete locations or in discrete patterns. When applied in discrete locations, adhesive printing techniques can be used.

FIG. 3A illustrates a web assembly containing a web base 31 of materials noted herein concerning the substrate or web 11. This embodiment web assembly has a layer of adhesive 32 previously applied over the web base 31 so the wire is dispensed onto an adhesive surface that is not yet set and thus capable to securing the wire onto the web. As can be seen in FIG. 3A, when the wire 21 is dispensed from the dispenser head 14 the wire engages the adhesive in a manner to effectively hold the shaped wire lengths 22, 22a, 22b onto the web. In some embodiments, the shaped wire lengths remain visible above the adhesive layer 32; in other embodiments, the shaped wire lengths 22, 22a, 22b "sink" into the adhesive which is still tacky at that time or that is cured in a manner to hold the wire in place. Details of the interaction between adhesive and shaped wire lengths will vary depending on the type of adhesive and its properties, including its viscosity.

If the shaped wire lengths are fully encapsulated into the adhesive, it may be useful for performance purposes to utilize an adhesive having suitable conductivity properties so avoid interference with desired properties such as those of RFID antenna components. In this FIG. 3A embodiment, the web base 31 is pre-coated with an adhesive such as a pressure sensitive adhesive or hot melt adhesive of types generally known in the art. Whether or not the shaped wire lengths become enveloped in the adhesive will depend on the thickness of the adhesive, its viscosity, the pressure, temperature and other conditions. It will be understood that if the thickness of the adhesive on the web is less than the diameter of the wire, some portion of the wire will be exposed and not fully enveloped.

FIG. 3B illustrates an adhesive-containing embodiment having a web base 41 that is not pre-coated either as presented as the web or at a work station upstream of the wire dispenser. This embodiment dispenses an adhesive onto the web base 41 at the same time as the adhesive 42 is deposited. The adhesive deposit also can follow the pattern laid out by the combined action of oscillation of the dispenser and flow of the web 41 This embodiment may include a particular dispensing head 44 having a dispensing outlet 47 that simultaneously accommodates the wire 48 and the adhesive 42. This can include having the dispensing outlet 47 in engagement with the web base so as to reduce adhesive build up or interference with the movement or flow of the web base 41. Also, the adhesive can be dispensed through the same aperture of the dispensing head 44 or through a separate aperture adjacent to the wire dispensing location. The result is a dispensed wire and adhesive combination in the form of adhesive-coated wire shaped lengths 49, which adhesive coating can be full or partial on the shaped wire lengths.

Since the adhesive is essentially extruded with the wire according to this approach, it is very likely the wire will become coated by the adhesive regardless of the amount in contact with the web surface. It can be considered that the FIG. 3B approach places the adhesive with enhanced efficiency, placing the adhesive where it is needed, reducing stiffness and cost.

The FIG. 3C embodiment substitutes for adhesive securing or supplements adhesive use with a mechanical system and approach. Shaped wire lengths 52 are dispensed onto a web base 51 through a suitable dispenser head 53. In this illustration, the mechanical securement is achieved through the use of a plurality of attachment members 54 that are applied with the assistance of an applicator 55. When the attachment members 54 are stiches or form stiches, the applicator 55 is a stitching head, for example. In connection with this embodiment, advantageous securement is enhanced by placing the applicator 55 closely downstream in proximity with the dispensing head of the wire dispenser 53.

The embodiments illustrated in FIG. 3A are relatively simple; either flood coat the web with the adhesive to provide a continuous sheet of adhesive on a web, or present the adhesive in a pattern, typically by printing action, that is effectively an image of the shaped wire to be deposited. This patterned adhesive is more specifically exemplified by the embodiment of FIG. 1A where the adhesive layer 32 is in the form of the adhesive pattern 19 along the web 11a of FIG. 1A.

It can be desired to embed the wire in the adhesive, either fully or partially, to make the shaped wire lengths more resistant to the environment, such as washing, or to mechanical stress detaching the wire from the substrate. If so, the flooding approach that coats the web with adhesive, if done uniformly along all or much of the web, requires more adhesive than if a patterned adhesive approach were used. This increases costs and, especially for fabric applications, reduces flexibility desired for many fabric applications. In this sense, the approach of FIG. 1A that provides the adhesive patterns 19 at a thickness to embed the shaped wire lengths 22 both protects the wire well while saving on adhesive cost and improving flexibility when compared with the flooding approach. Concerning the embodiments illustrated in FIG. 3B, this inherent coating approach protects the shaped wire lengths better than other approaches that may not result in fully encased shaped wire lengths such as flood coating of the web with a thinner layer of adhesive to save cost and enhance flexibility in the final RFID device.

The embodiments illustrated in FIGS. 1 through 3C and FIG. 5 form what might be considered an intermediate component in making an RFID device. These embodiments create antenna components in a system of creating RFID components added at a later stage to manufacture the final RFID device. This is a typical approach for manufacturing RFID tags, and the antenna component is coupled to the RFID element at a later stage, on the same line or a separate line.

Figure 4:
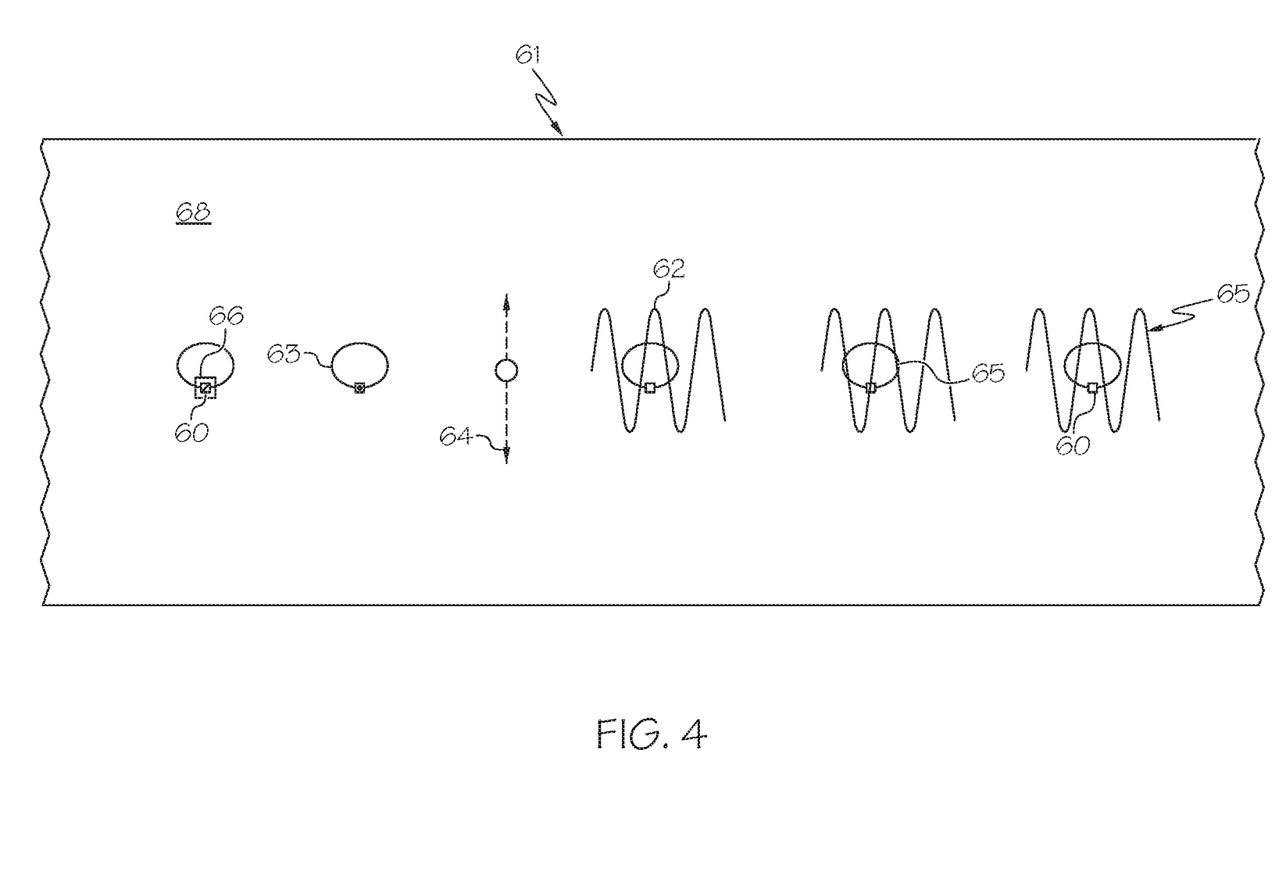
FIG. 4 is a diagrammatic plan view of an embodiment including incorporation of RFID chips in the assembly.

According to an alternative approach, the RFID device can be formed in what might be considered a single step, and an embodiment of this approach is illustrated in FIG. 4. FIG. 4 essentially re-orders the process of which embodiments in FIGS. 1-3C and 5 are examples, in that the RFID element is applied first to the web, or is created on the web, and the antenna is formed onto the RFID element. Typical RFID elements are chips, and the approach is suitable for other RFID elements selected according to the end use objectives and specifications.

With specific reference to FIG. 4, the shaped wire lengths, dispensed according to the various dispensing embodiments noted herein or others not explicitly disclosed, are dispensed over an RFID element. A series of RFID elements 60 are positioned on or applied to the web base 61, or are themselves created on the web. The RFID elements are positional along and spaced on the web so as to be in alignment with the wire dispensing head 64 as the RFID element moves to the dispensing head. When the web base 61 having a dispensing head 68 therealong translates the RFID elements 60 to the outlet of the dispensing head 64, shaped wire lengths 62 are deposited onto respective RFID elements 60 and secured thereto, typically with the assistance of a coupling structure 63. Suitable coupling structures can be those generally known in the art. Such securing is by coupling for forming a series of RFID components 65 that include an RFID element such as chip suitably coupled to an antenna and secured to web material.

As will be appreciated by those skilled in the art, the coupling feature can be achieved in various manners. Included are the following. The RFID elements 60 may have a coupling structure such as magnetic loops and/or pads 66 attached to the RFID elements 60. Coupling between shaped wire lengths 62 and the RFID element loops, pads or other coupling structures or interposers can be by magnetic fields, by electric fields, by a combination of both magnetic and electric fields, or by a conductive connection using a conductive adhesive. Alternatively, the shaped wire lengths designed to function as antennas can be welded to the RFID element or an interposer for the RFID element.

Figure 5:
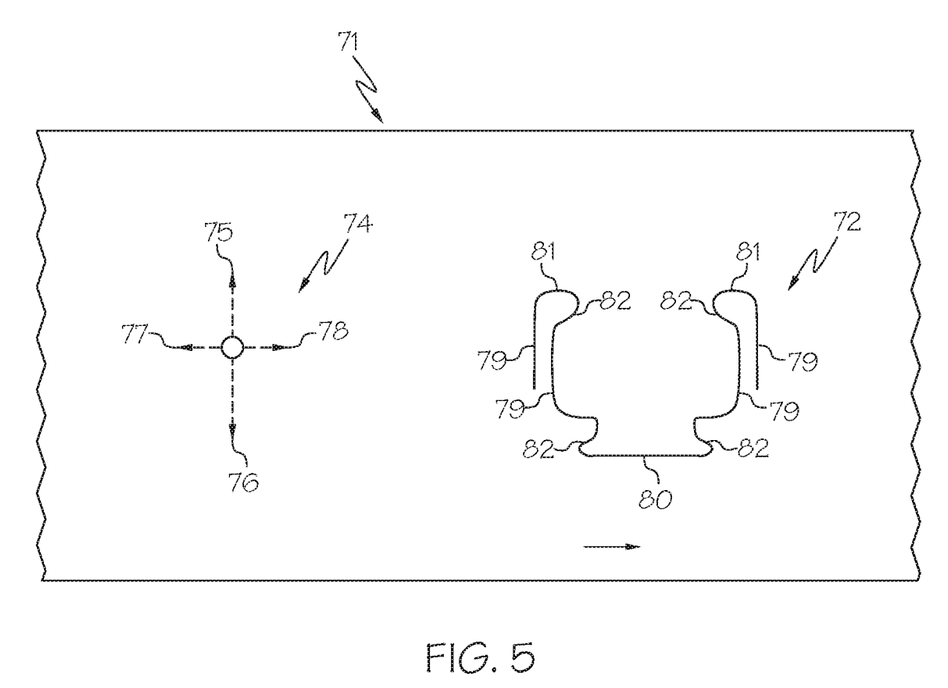
FIG. 5 is a diagrammatic plan view of another embodiment illustrating multi-axis movement of wire being dispensed.

Another alternative embodiment is illustrated in FIG. 5 wherein the wire dispenser has both cross-web and web-directional axis movement, the latter usually to a lesser amount than the cross-web action. Web 71 moves in the left-to-right direction as shown by the arrow in FIG. 5. Similar to other embodiments, for example that of FIG. 1, the dispenser head 74 moves according to opposing direction arrowhead points 75 and 76, with the dispensing head moving along the thus illustrated cross-web path or directional axis, oscillating given distances between or short of point or points 75 and 76. In this embodiment, the dispensing head 74 oscillates between points 75 and 76 along a pathway having a designated directional axis (second directional axis) that is different from movement of the web 71 along the first directional axis.

This FIG. 5 embodiment adds a third directional axis movement partially or fully between arrowhead points 77 and 78. When moving toward point 77, the dispenser head 74 moves against the direction of web movement, thereby allowing the dispensing wire to move backwards along the web. Usually this movement is for a relatively short distance to achieve limited distance movement essentially defined by the maximum deflection of the head to the point 77. For example, when the dispenser head moves against the web direction for approximately 10 mm along the third directional axis, this combined with the cross-web motion along the second directional axis will dispense shaped wire lengths or antennas with sections where the wire had moved backwards and/or had moved at 90 degrees to the web direction, or along the first directional axis, by combining two motions to compensate for the web moving for a limited distance along the third directional axis.

The shaped wire length 72 provides an example of the "drawing" of wire shapes that can be achieved with this embodiment. Sections 79 which can be considered perpendicular to the web flow along the first directional axis are achieved by movement of the dispenser head 74 along the second directional axis while combining the effects of moving toward point 77 along the third directional axis while the web continues to move in the opposite direction along the first directional axis. Sections such as at 80, which are generally parallel to the web flow along the first directional axis, are achieved by no or substantially movement of the dispenser head along the second directional axis. Sections such as curves 81 can be formed by combination movement along all three directional axes, with movement along the third directional axis is generally in the web direction. What can be considered undercut curve sections 82 can be formed by combination movement along all three directional axes, with movement along the third directional axis being generally opposite to the web direction along the first directional axis followed by the web 71.

In a typical embodiment, the first and third directional axes are generally parallel to each other and substantially perpendicular to the second directional axis or cross-web direction. Other embodiments could vary these relationships to achieve particular "drawing" effects, while another embodiment features the first and third directional axes being strictly parallel to each other and each being strictly perpendicular to the second directional axis.

From the above, it will be understood that this mechanism and system allows for flexible manufacture of shaped flexible wire lengths useful as RFID antennas for RFID devices.

The method and system achieve these advantageous results in significantly less time than possible using other methods and systems for manufacturing such shaped flexible wire lengths, including on supportive and/or functional webs.

It will be understood that the movements and/or oscillations described herein are capable of being controlled by suitable movement generators and controllers. For example, software can be incorporated in a suitable control system that allows the operator to select among numerous combinations of web flow speed, oscillation speeds and lengths, and combinations of same in order to rapidly form the antennas according to desired shape and size parameters. It is possible to vary such parameters as desired and to provide a flow of antenna components that are shaped as selected, each being consistent in size, shape and quality from antenna component to antenna component according to the selected configuration and parameters.

It will be understood that the embodiments described above are illustrative of some of the applications of the principles of the present subject matter. Numerous modifications may be made by those skilled in the art without departing from the spirit and scope of the claimed subject matter, including those combinations of features that are individually disclosed or claimed herein. For these reasons, the scope hereof is not limited to the above description but is as set forth in the following claims, and it is understood that claims may be directed to the features hereof, including as combinations of features that are individually disclosed or claimed herein.

The invention claimed is:

1. An antenna component assembly method, comprising:
    selecting a web having a receptor surface and translating same along a first directional axis to form a translating web;
    providing a dispenser with a dispenser head and positioning the dispenser head at a location closely spaced from the receptor surface of the translating web, the dispenser being associated with a supply of wire;
    oscillating the dispenser head in at least one direction that is along a second directional axis, the second directional axis being perpendicular to the first directional axis, while dispensing wire from the supply of wire through the dispensing head and onto the web;
    said translating of the web, said oscillating of the dispenser head and said dispensing of wire combine to deposit a flow of shaped wire lengths onto the translating web to form a deposit of shaped wire; and
    combining the deposit of shaped wire lengths with the web to form a flow of antenna component assemblies.

2. The method in accordance with claim 1, further including interrupting the wire dispensing at locations so as to define a plurality of antenna components with a wire antenna of desired shape and size.

3. The method in accordance with claim 2, wherein the interrupting includes severing the wire before the deposit of shaped wire onto the translating web and at locations so as to define a plurality of wire antennas, whereby the antenna component assembly comprises the plurality of wire antennas on the web.

4. The method in accordance with claim 1, wherein the combining comprises layering an adhesive onto the receptor surface of the web prior to the dispensing of the wire.

5. The method of claim 1, wherein the combining comprises positioning a plurality of shaped adhesive areas along the web prior to dispensing of the wire, dispensing the shaped wire lengths onto the shaped adhesive areas, respectively, and the shaped adhesive areas are along only a portion of the web.

6. The method in accordance with claim 1, wherein the combining comprises dispensing adhesive substantially simultaneously with the dispensing of wire.

7. The method in accordance with claim 1, wherein the combining comprises stitching of the deposit of shaped wire onto the web.

8. The method in accordance with claim 1, wherein the web includes a plurality of RFID elements spaced apart longitudinally with respect to the receptor surface of the web, and the depositing of shaped wire onto the translating web includes securing the shaped wire to the RFID elements or to interposers of the RFID elements.

9. The method in accordance with claim 8, wherein the RFID elements include coupling structures, and the securing adheres the shaped wires onto respective coupling structures by adherence members selected from the group consisting of adhesives, magnetic fields, electric fields, conductive connections, welding, and combinations thereof.

10. The method in accordance with claim 1, wherein the oscillating of the dispenser head along at least one directional axis further includes moving the dispenser head along a third directional axis in addition to the second directional axis, the second and third directional axes being different from each other, and said translating of the web along said first directional axis, said oscillating of the dispensing head along the second direction axis, and said moving of the dispenser head along the third directional axis combine to form the shaped wire deposits.

11. The method in accordance with claim 10, wherein the first and third directional axes are substantially parallel to each other.

12. The method in accordance with claim 10, wherein said oscillating along the second directional axis and said moving along the third directional axis proceed according to a timing pattern selected from the group consisting of simultaneous movement to provide a non-linear path, movement along the second directional axis and not the third directional axis, movement along the third directional axis and not the second directional axis, and combinations thereof.

13. An RFID device assembly method, comprising:
    selecting a web having a receptor surface and translating same along a first directional axis to form a translating web;
    providing a plurality of RFID elements positioned on the receptor surface;
    providing a dispenser with a dispenser head and positioning the dispenser head at a location spaced from the receptor surface of the translating web, the dispenser being associated with a supply of wire;
    oscillating the dispenser head in at least one direction that is along a second directional axis, the second direction being perpendicular to the first directional axis, while dispensing wire from the supply of wire through the dispensing head and onto the web;
    said translating of the web, said oscillating of the dispenser head and said dispensing of wire combine to deposit a flow of shaped wire lengths onto the translating web to form a flow of shaped wire lengths onto respective RFID elements on the web receptor surface; and
    securing the deposit of shaped wire lengths onto the web to form a flow of RFID element and antenna component assemblies as RFID devices.

14. The method in accordance with claim 13, wherein the RFID elements include coupling structures, and the securing adheres the shaped wire lengths onto respective coupling structures by adherence members selected from the group consisting of adhesives, magnetic fields, electric fields, conductive connections, welding, and combinations thereof.

15. The method in accordance with claim 13, wherein the oscillating of the dispenser head along at least one directional axis further includes moving the dispenser head along a third directional axis in addition to the second directional axis, the second and third directional axes being different from each other, and said translating of the web along said first directional axis, said oscillating of the dispensing head along the second direction axis, and said moving of the dispenser head along the third directional axis combine to form the shaped wire deposits, and the first and third directional axes are substantially parallel to each other and substantially perpendicular to the second directional axis.

16. The method in accordance with claim 13, further including interrupting the wire dispensing at locations so as to define a plurality of antenna components with a wire antenna of desired shape and size, wherein the interrupting includes severing the wire before the deposit of shaped wire onto the translating web and at locations so as to define a plurality of web antennas.

17. The method in accordance with claim 16, wherein the securing comprises dispensing adhesive with the dispensing wire.

18. The method in accordance with claim 13, wherein the securing comprises dispensing adhesive with the dispensing wire.

* * * * *